US007756249B1

(12) United States Patent
Harding

(10) Patent No.: US 7,756,249 B1
(45) Date of Patent: Jul. 13, 2010

(54) COMPACT MULTI-FOCUS X-RAY SOURCE, X-RAY DIFFRACTION IMAGING SYSTEM, AND METHOD FOR FABRICATING COMPACT MULTI-FOCUS X-RAY SOURCE

(75) Inventor: Geoffrey Harding, Hamburg (DE)

(73) Assignee: Morpho Detection, Inc., Newark, CA (US)

( * ) Notice: Subject to any disclaimer, the term of this patent is extended or adjusted under 35 U.S.C. 154(b) by 0 days.

(21) Appl. No.: 12/388,907

(22) Filed: Feb. 19, 2009

(51) Int. Cl.
*G01N 23/201* (2006.01)

(52) U.S. Cl. ........................................................ 378/87

(58) Field of Classification Search ................... 378/70, 378/86–90
See application file for complete search history.

(56) References Cited

U.S. PATENT DOCUMENTS 5,500,886 A 3/1996 Duff
6,442,233 B1 * 8/2002 Grodzins et al. .............. 378/57
6,621,888 B2 * 9/2003 Grodzins et al. .............. 378/57
7,463,720 B2 12/2008 Harding et al.
2007/0133744 A1 6/2007 Bijjani
2007/0172024 A1 * 7/2007 Morton et al. ................ 378/10
2008/0013684 A1 1/2008 Harding
2008/0013688 A1 1/2008 Harding
2008/0175350 A1 * 7/2008 MacDonald ................ 378/37
2008/0304622 A1 12/2008 Morton
2009/0028294 A1 1/2009 Harding
2009/0060135 A1 3/2009 Morton

* cited by examiner

*Primary Examiner*—Irakli Kiknadze
(74) *Attorney, Agent, or Firm*—Armstrong Teasdale LLP

(57) ABSTRACT

A multi-focus x-ray source (MFXS) for a multiple inverse fan beam x-ray diffraction imaging (MIFB XDI) system. The MFXS includes a plurality of focus points (N) defined along a length of the MFXS collinear with the y-axis. The MFXS is configured to generate the plurality of primary beams, and at least M coherent x-ray scatter detectors are configured to detect coherent scatter rays from the primary beams as the primary beams propagate through a section of the object positioned within the examination area when a spacing P between adjacent coherent x-ray scatter detectors satisfies the equation:

$$P = \frac{W_s \cdot V}{M \cdot U},$$

where $W_s$ is a lateral extent of the plurality of focus points, U is a distance from the y-axis to a top surface of the examination area, and V is a distance from the top surface to the line at the coordinate X=L.

17 Claims, 4 Drawing Sheets

COMPACT MULTI-FOCUS X-RAY SOURCE, X-RAY DIFFRACTION IMAGING SYSTEM, AND METHOD FOR FABRICATING COMPACT MULTI-FOCUS X-RAY SOURCE

BACKGROUND OF THE INVENTION

1. Field of the Invention

The embodiments described herein relate to a multi-detector inverse fan beam x-ray diffraction imaging (MIFB XDI) system and, more particularly, to an x-ray source suitable for use with an MIFB XDI system.

2. Description of Related Art

Known security detection systems are used at travel checkpoints to inspect carry-on and/or checked bags for concealed weapons, narcotics, and/or explosives. At least some known security detection systems include x-ray imaging systems. In an x-ray imaging system, an x-ray source transmits x-rays through an object or a container, such as a suitcase, towards a detector, and the detector output is processed to identify one or more objects and/or one or more materials in the container.

At least some known security detection systems include a multi-detector inverse fan beam x-ray diffraction imaging (MIFB XDI) system. MIFB XDI systems use an inverse fan-beam geometry (a large source and a small detector) and a multi-focus x-ray source (MFXS). At least some known x-ray diffraction imaging (XDI) systems provide an improved discrimination of materials, as compared to that provided by other known x-ray imaging systems, by measuring d-spacings between lattice planes of micro-crystals in materials. Further, x-ray diffraction may yield data from a molecular interference function that may be used to identify other materials, such as liquids, in a container.

However, with at least some XDI systems that incorporate an MFXS in the inverse fan beam geometry a distribution of scatter signals across the object under investigation, e.g., a suitcase, may be significantly non-uniform. The non-uniform distribution of scatter signals may occur when a spatial extent of the MFXS, a lateral width of the suitcase and a spatial extent of the coherent x-ray scatter detector array are all comparable to one another. An example of such non-uniformity is shown in FIG. 1. Referring to FIG. 1, the MFXS (not shown) and the detector array (not shown) are both equal in width to a horizontal width of a container, such as a suitcase 5 positioned within an examination area 6 of a conventional MIFB XDI system. X-ray beams that are emitted by the MFXS and transmitted through areas, each designated by reference number 7, are detected only by one detector, whereas x-ray beams that are emitted by the MFXS and transmitted through areas each designated by reference number 8 are detected by two detectors, and these areas are relatively large in extent.

In order to achieve a more uniform coverage of the object, it is desirable that the MFXS is smaller than the object width. As a result, a group of corresponding x-rays, referred to herein as an inverse fan beam bundle of x-rays, from the MFXS arriving at each detector is fairly narrow (in a horizontal direction) and approximates a "pencil beam" that sweeps across the object from a beginning of a scan to an end of the scan.

BRIEF SUMMARY OF THE INVENTION

In one aspect, a multi-focus x-ray source (MFXS) for a multiple inverse fan beam x-ray diffraction imaging (MIFB XDI) system is provided. The MIFB XDI includes an examination area and a plurality of coherent x-ray scatter detectors positioned with respect to the examination area and configured to detect coherent scatter rays from a plurality of primary beams as the plurality of primary beams propagate through an object positioned within the examination area. The plurality of coherent x-ray scatter detectors are positioned with respect to a plurality of convergence points positioned along a line parallel to a y-axis of the MIFB XDI system at a coordinate X=L. The MFXS includes a plurality of focus points (N) defined along a length of the MFXS collinear with the y-axis. Each focus point of the plurality of focus points is configured to be sequentially activated to emit an x-ray fan beam including the plurality of primary beams each directed to a corresponding convergence point of the plurality of convergence points. The MFXS is configured to generate the plurality of primary beams, and at least M coherent x-ray scatter detectors of the plurality of coherent x-ray scatter detectors are configured to detect coherent scatter rays from the plurality of primary beams as the plurality of primary beams propagate through a section of the object positioned within the examination area when a spacing P between adjacent coherent x-ray scatter detectors of the plurality of coherent x-ray scatter detectors satisfies the equation:

$$P = \frac{W_s \cdot V}{M \cdot U},$$

where $W_s$ is a lateral extent of the plurality of focus points, U is a distance from the y-axis to a top surface of the examination area, and V is a distance from the top surface to the line at the coordinate X=L.

In another aspect, a multiple inverse fan beam x-ray diffraction imaging (MIFB XDI) system is provided. The MIFB XDI system includes a multi-focus x-ray source (MFXS) including an anode and a plurality of focus points (N) arranged along a length of the anode collinear with a y-axis of the MFXS. Each focus point of the plurality of focus points is configured to be sequentially activated to emit an x-ray fan beam including a plurality of primary beams. The MIFB XDI system also includes an examination area and a plurality of coherent x-ray scatter detectors positioned with respect to the examination area. The coherent x-ray scatter detectors are configured to detect coherent scatter rays from the plurality of primary beams as the plurality of primary beams propagate through an object positioned within the examination area. Each coherent x-ray scatter detector of the plurality of coherent x-ray scatter detectors is positioned with respect to a corresponding convergence point of a plurality of convergence points positioned along a line parallel to the y-axis at a coordinate X=L. At least M coherent x-ray scatter detectors of the plurality of coherent x-ray scatter detectors are configured to detect the coherent scatter rays as the plurality of primary beams propagate through a section of the object and a spacing P between adjacent coherent x-ray scatter detectors of the plurality of coherent x-ray scatter detectors satisfies the equation:

$$P = \frac{W_s \cdot V}{M \cdot U},$$

where $W_s$ is a lateral extent of the plurality of focus points, U is a distance from the y-axis to a top surface of the examination area, and V is a distance from the top surface to the line at coordinate X=L.

In yet another aspect, a method is provided for fabricating a multi-focus x-ray source (MFXS) for a multiple inverse fan beam x-ray diffraction imaging (MIFB XDI) system. The MIFB XDI system includes an examination area and a plurality of coherent x-ray scatter detectors positioned with respect to the examination area and configured to detect coherent scatter rays from a plurality of primary beams as the plurality of primary beams propagate through an object positioned within the examination area. The method includes defining a plurality of focus points (N) along a length of the MFXS collinear with a y-axis of the MIFB XDI system. Each focus point of the plurality of focus points is configured to be sequentially activated to emit an x-ray fan beam including a plurality of primary beams each directed to a corresponding convergence point of a plurality of convergence points positioned along a line parallel to the y-axis at a coordinate X=L. The MFXS is positioned with respect to the examination area of the MIFB XDI system. At least M coherent x-ray scatter detectors of the plurality of coherent x-ray scatter detectors are configured to detect the coherent scatter rays as the plurality of primary beams propagate through a section of an object positioned within the examination area and a spacing P between adjacent coherent x-ray scatter detectors of the plurality of coherent x-ray scatter detectors positioned with respect to the corresponding convergence point along the line at the coordinate X=L, satisfies the equation:

$$P = \frac{W_s \cdot V}{M \cdot U},$$

where $W_s$ is a lateral extent of the plurality of focus points, U is a distance from the y-axis to a top surface of the examination area, and V is a distance from the top surface to the line at the coordinate X=L.

DETAILED DESCRIPTION OF THE INVENTION

The embodiments described herein provide a multi-detector inverse fan beam x-ray diffraction imaging (MIFB XDI) system configured to emit several pencil primary x-ray beams from each focus point on a multi-focus x-ray source (MFXS). The MIFB XDI system has greater photon efficiency, i.e., a higher signal-to-noise ratio, than an inverse fan beam with conventional systems having a single detector. Further, the MIFB XDI system allows an analysis of object material from numerous projection directions and is compatible with a quasi-3D tomosynthesis system by synergistically using the MFXS for x-ray diffraction imaging (XDI) and projection imaging.

The MIFB XDI system includes a multi-focus x-ray source (MFXS) that is very compact, i.e., not greater than 500 mm in length to facilitate achieving a uniform signal distribution across the object being scanned. Additionally, the MFXS as described herein is less expensive than conventional x-ray sources to fabricate and has a longer lifetime than the x-ray sources incorporated into conventional MIFB systems and configurations. As a result, the MIFB XDI system including the MFXS as described herein facilitates reducing a fabrication cost for the system, increasing a lifetime of the x-ray source, providing a uniform intensity distribution, lowering a false alarm rate and/or increasing a detection rate.

While described in terms of detecting contraband including, without limitation, weapons, explosives, and/or narcotics, within checked or carry-on baggage, the embodiments described herein may be used for any suitable security detection or other x-ray diffraction imaging application, including applications in the plastics recycling, pharmaceutical and non-destructive testing industries. Further, angles and/or dimensions shown in the accompanying figures may not be to scale, and may be exaggerated for clarity.

Figure 2:
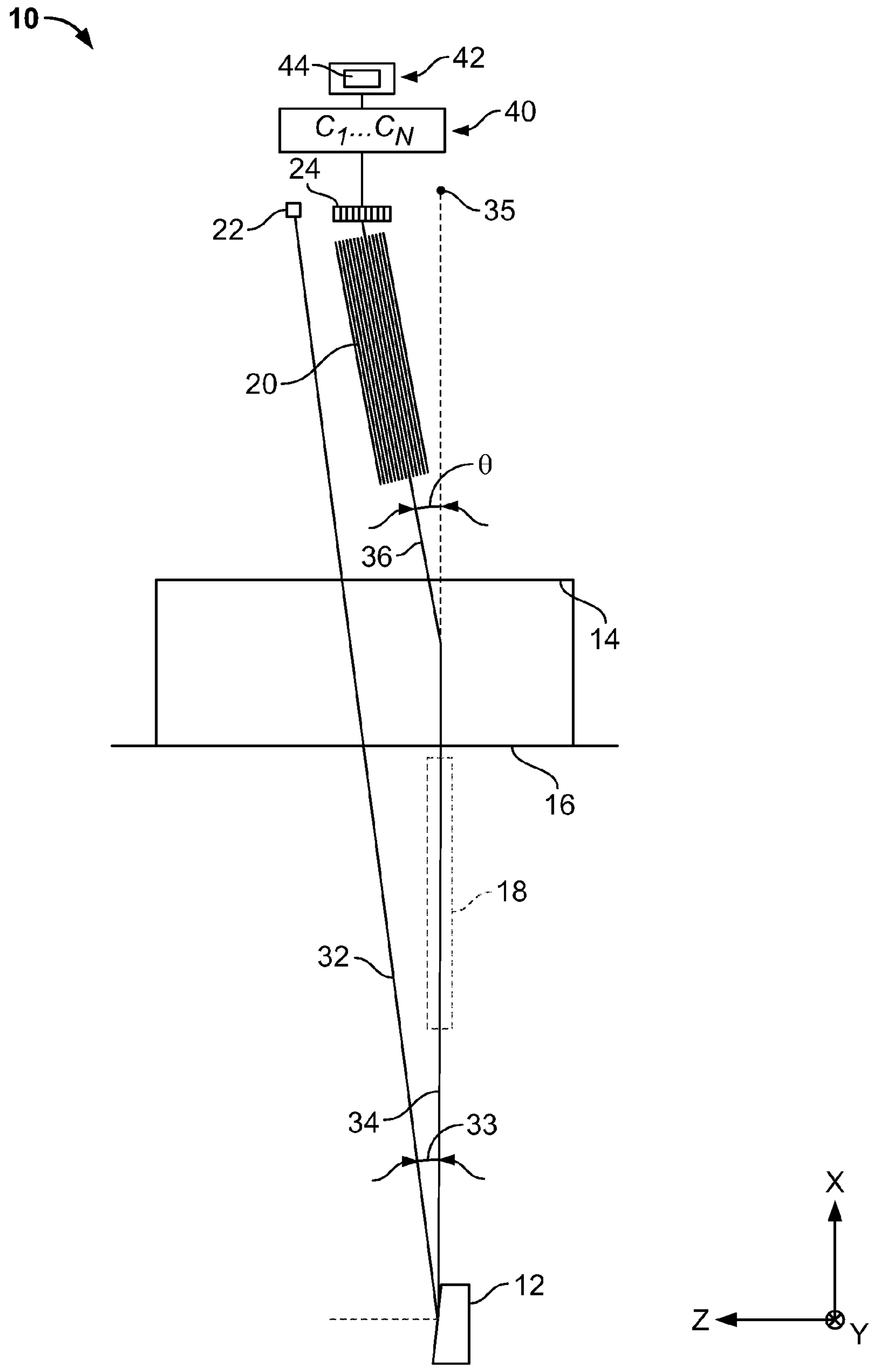
FIG. 2 is a schematic view, in an X-Z plane, of an exemplary security detection system.

FIG. 2 is a schematic view, in an X-Z plane, of an exemplary security detection system 10. In the exemplary embodiment, security detection system 10 is a multi-detector inverse fan beam x-ray diffraction imaging (MIFB XDI) system that includes a multi-focus x-ray source (MFXS) 12, an examination area 14, a support 16 configured to support an object, a primary collimator 18, and a secondary collimator 20. Security detection system 10 also includes two types of detectors, an array of transmission detectors 22 and a plurality of discrete coherent x-ray scatter detectors 24. Transmission detectors 22 are offset in a z-axis direction from coherent x-ray scatter detectors 24.

Figure 3:
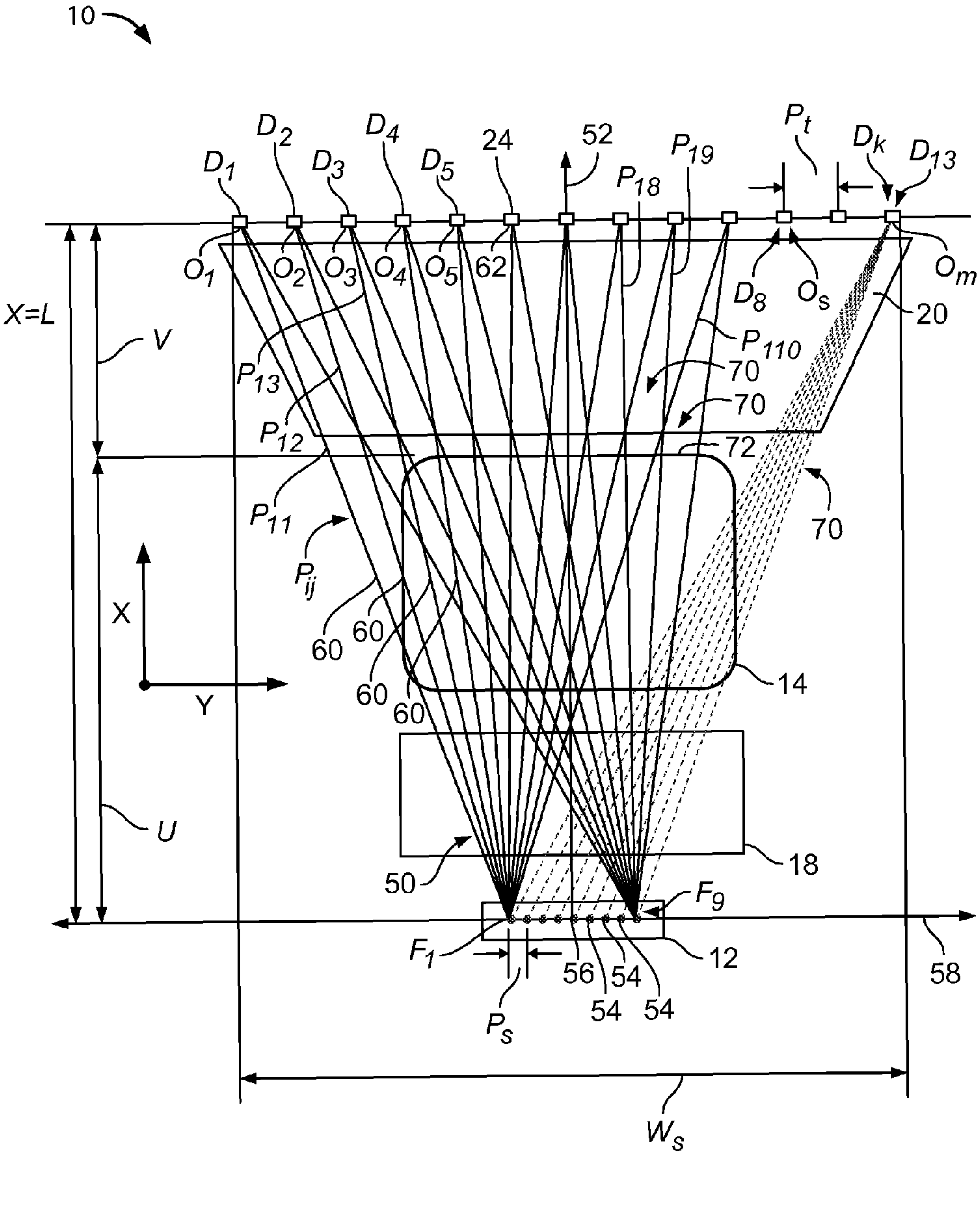
FIG. 3 is a schematic view, in an X-Y plane, of the security detection system shown in FIG. 1.

In the exemplary embodiment, MFXS 12 is capable of emitting x-ray radiation sequentially from a plurality of focus points, as described below, distributed along MFXS 12 in a direction substantially parallel to a y-axis perpendicular to the z-axis. In the exemplary embodiment, MFXS 12 has nine (9) focus points, as shown in FIG. 3. In an alternative embodiment, MFXS 12 has approximately 40 to 100 focus points. However, it should be apparent to those skilled in the art and guided by the teachings herein provided that in further alternative embodiments, MFXS 12 may include any suitable number of focus points that will allow security detection system 10 to function as described herein.

Further, in the exemplary embodiment, MFXS 12 is located on or coupled to a lower support surface, such as at or near a floor, while transmission detectors 22 and coherent x-ray scatter detectors 24 are located on or coupled to an upper support structure, such as at or near a ceiling. In an alternative embodiment, MFXS 12 is located on or coupled to an upper support structure, such as at or near a ceiling, while transmission detectors 22 and coherent x-ray scatter detectors 24 are located on or coupled to a lower support surface, such as at or near a floor. Further, in the exemplary embodiment, MFXS 12, transmission detectors 22 and coherent x-ray scatter detectors 24 are stationary, support 16 is a conveyor belt capable of movement backward and forward in a direction substantially parallel to the z-axis, and examination area 14 is a baggage tunnel through which the conveyor belt moves. In an alternative embodiment, MFXS 12, transmission detectors 22 and coherent x-ray scatter detectors 24 are capable of coordinated movement at least in a direction substantially parallel to the z-axis, and support 16 is stationary. In certain alternative embodiments, MFXS 12, transmission detectors 22, coherent x-ray scatter detectors 24 and support 16 are all capable of movement.

In the exemplary embodiment, MFXS 12 is configured to emit an x-ray fan beam 32 from each focus point of MFXS 12.

Each fan beam 32 lies substantially in a plane at an angle 33 relative to a vertical x-axis perpendicular to the z-axis and the y-axis. Each fan beam 32 is directed at transmission detectors 22. In the exemplary embodiment, angle 33 is approximately ten degrees. In an alternative embodiment, angle 33 is approximately fifteen degrees. In further alternative embodiments, angle 33 is any suitable angle that will allow security detection system 10 to function as described herein.

Figure 1:
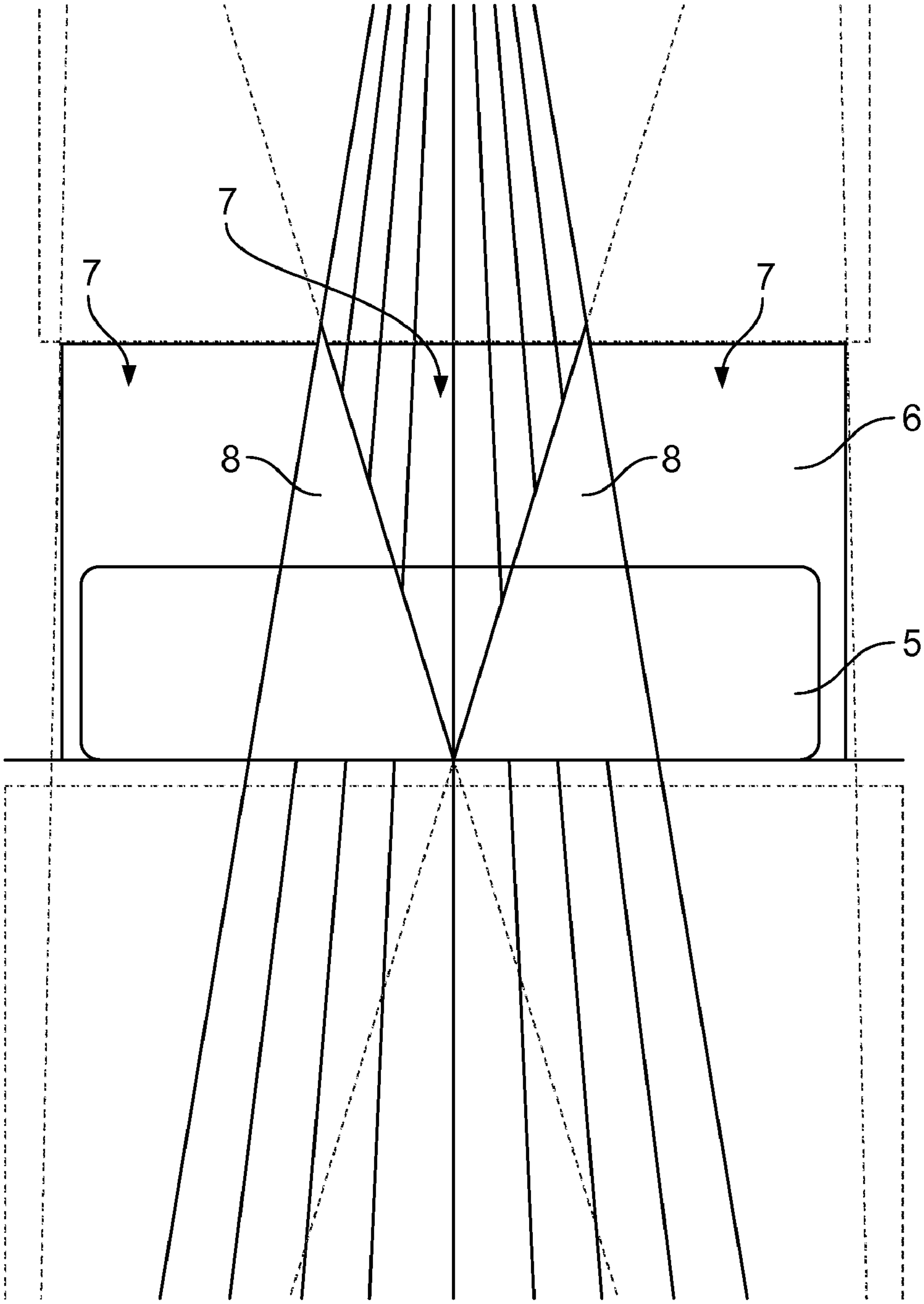
FIG. 1 (Prior Art)
FIG. 1 shows a non-uniform signal variation in a conventional, prior art multi-detector inverse fan beam x-ray diffraction imaging (MIFB XDI) system.

In addition, MFXS 12 is configured to emit, through primary collimator 18, a set of x-ray pencil beams 34, from each focus point of MFXS 12. Each pencil beam 34 is directed at a corresponding convergence point 35 which lies in the same X-Y plane as MFXS 12. Further, each convergence point 35 is positioned at the same X-coordinate value, but at different Y-coordinate values. Because each pencil beam 34 is emitted in the same X-Y plane, only one pencil beam 34 (and only one convergence point 35) is visible in the X-Z cross-section view of FIG. 1.

A portion of the x-ray radiation from each pencil beam 34 typically is scattered in various directions upon contact with a container (not shown) in examination area 14. Secondary collimator 20 is configured to facilitate ensuring that a portion of scattered radiation 36 arriving at each coherent x-ray scatter detector 24 has a constant scatter angle θ with respect to the corresponding pencil beam 34 from which scattered radiation 36 originated. In certain embodiments, scatter angle θ is approximately 0.04 radians. Coherent x-ray scatter detectors 24 can be positioned between pencil beams 34 and fan beam 32 to ensure that only scattered radiation from the former and not the latter is detected. For example, secondary collimator 20 is configured to absorb scattered radiation (not shown) that is not parallel to the direction of scattered radiation 36. Further, although, in the exemplary embodiment, secondary collimator 20 and coherent x-ray scatter detectors 24 are positioned on one side of pencil beams 34 with respect to the z-axis, in alternative embodiments secondary collimator 20 and coherent x-ray scatter detectors 24 may be positioned on the other side, or on both sides, of pencil beams 34 with respect to the z-axis.

In the exemplary embodiment, transmission detectors 22 are charge integration detectors, while coherent x-ray scatter detectors 24 are pulse-counting energy-resolving detectors. Transmission detectors 22 and each coherent x-ray scatter detector 24 are in electronic communication with a number of channels 40, for example, N number of channels $C_1, \ldots C_N$, wherein N is selected based on the configuration of security detection system 10. Channels 40 electronically communicate data collected by transmission detectors 22 and each coherent x-ray scatter detector 24 to a data processing system 42. In the exemplary embodiment, data processing system 42 combines an output from transmission detectors 22 and an output from coherent x-ray scatter detectors 24 to generate information about the contents of an object positioned within examination area 14. For example, but not by way of limitation, data processing system 42 may generate multiview projections and/or section images of a container (not shown) in examination area 14 that identify a location in the container of specific materials detected by XDI analysis.

In the exemplary embodiment, data processing system 42 includes a processor 44 in electrical communication with transmission detectors 22 and coherent x-ray scatter detectors 24. Processor 44 is configured to receive from coherent x-ray scatter detectors 24 output signals representative of the detected x-ray quanta and generate a distribution of momentum transfer values, x, from a spectrum of energy, E, of x-ray quanta within scattered radiation detected by coherent x-ray scatter detectors 24. As used herein, the term processor is not limited to integrated circuits referred to in the art as a processor, but broadly refers to a computer, a microcontroller, a microcomputer, a programmable logic controller, an application specific integrated circuit, and any other suitable programmable circuit. The computer may include a device, such as a floppy disk drive, a CD-ROM drive and/or any suitable device, for reading data from a suitable computer-readable medium, such as a floppy disk, a compact disc-read only memory (CD-ROM), a magneto-optical disk (MOD), or a digital versatile disc (DVD). In alternative embodiments, processor 44 executes instructions stored in firmware.

FIG. 3 is a schematic view, in an X-Y plane, of security detection system 10. Referring further to FIG. 3, in one embodiment, a multi-detector inverse fan beam (MIFB) 50 is projected along x-axis 52 onto the X-Y plane. In one embodiment, MFXS 12 emits radiation sequentially from a plurality of focus points 54. More specifically, MFXS 12 includes an anode 56 and a plurality of focus points 54 arranged along a length of anode 56 colinear with a y-axis 58 of MFXS 12. Each focus point 54 is sequentially activated to emit an x-ray fan beam. For example, focus point $F_1$ emits fan beam MIFB 50 that extends between and is detected by coherent x-ray scatter detector $D_1$ through and including coherent x-ray scatter detector $D_{13}$ and includes a plurality of pencil primary beams 60. Focus points 54 are denoted $F_r$, $F_2$, . . . with a running index i. Primary collimator 18 is configured to select from the radiation emitted at each focus point 54, primary beams that are directed to a series of convergence points 60 labeled $O_1, O_2, \ldots, O_j, \ldots, O_m$ with a running index j regardless of which focus point 54 is activated. Ten primary beams 60 are shown in FIG. 3 with each primary beam 60 emitted from focus point $F_1$ directed to a corresponding convergence point $O_1, O_2, \ldots, O_j, \ldots, O_{10}$ positioned along a line parallel to the y-axis at a coordinate X=L with focus point $F_1$ activated.

A plurality of discrete coherent x-ray scatter detectors 24 labeled discrete coherent x-ray scatter detectors $D_1, D_2, \ldots, D_j, \ldots, D_k$ with a running index j are positioned at a suitable or desirable distance in a direction along the Z-axis from a corresponding convergence point 62 to record coherent scatter at an angle θ from primary beam $P_{ij}$ in discrete coherent x-ray scatter detector $D_j$. In one embodiment, this distance is about 30 mm for a scatter angle of about 0.037 radians at a distance of about 750 mm between a scatter center and a corresponding coherent x-ray scatter detector $D_j$. A combination of the MFXS and the discrete coherent x-ray scatter detectors facilitates examining a volume of an object positioned within examination area without any dead area from which no XDI signal is detected or measured.

As primary beam 60 labeled $P_{ij}$ propagates through an object (not shown) positioned within examination area 14, primary beam $P_{ij}$ interacts with the object to produce coherent scatter that may be detected in coherent x-ray scatter detectors $D_{j+1}$, $D_{j+2}$, $D_{j-1}$, and/or $D_{j-2}$, for example. As shown in FIG. 3, primary beams $P_{11}, P_{12}, P_{13}, P_{14}, P_{15}, \ldots P_{1m}$ are emitted from focus point $F_1$ and directed to corresponding convergence points $O_1, O_2, O_3, O_4, O_5, \ldots O_m$, respectively. As each primary beam $P_{11}, P_{12}, P_{13}, P_{14}, P_{15}, \ldots P_{1m}$ moves through examination area 14, each primary beam $P_{11}, P_{12}, P_{13}, P_{14}, P_{15}, \ldots P_{1m}$ collides with and/or interacts with an object (not shown) positioned within examination area 14 to produce coherent scatter (not shown) that is detectable at one or more coherent x-ray scatter detectors $D_1, D_2, D_3, D_4, D_5, \ldots D_k$, for example.

In one embodiment, MFXS 12 is positioned on the y-axis (x=0) of a Cartesian coordinate system. Each focus point 54 has a position on a grid having a pitch, $P_s$. Further, convergence points 62 lie parallel to the y-axis at coordinate X=L, and each convergence point 62 has a position on a grid having a pitch, $P_t$. In a particular embodiment, for an XDI checked baggage screening system, L is about 2000 millimeters (mm) to about 2500 mm, $P_s$ is about 25 mm, and $P_t$ is about 50 mm to about 200 mm. In this embodiment, a plurality of coherent x-ray scatter detectors 24 are positioned at the same y-coordinate as convergence points 62. One pair of coherent x-ray scatter detectors 24 may be associated with a corresponding convergence point 62 with the pair of coherent x-ray scatter detectors 24 positioned on both sides of the X-Y plane. In a further embodiment, thirteen (13) convergence points are used to allow for several convergence point position arrangements to incorporate a different number of coherent x-ray scatter detectors 24. If all convergence points 62 have detector pairs then security detection system 10 may include twenty-six (26) coherent x-ray scatter detectors 24. In alternative embodiments, fewer coherent x-ray scatter detectors 24 may be positioned at convergence point positions 1, 3, 5, 7, 9, 11 and 13; or at convergence point positions 1, 4, 7, 10 and 13; or at convergence point positions 1, 5, 9 and 13 to account for manufacturing and/or cost constraints. An MIFB configuration including 13 convergence points spanning a width in the Y direction in total of 2000 mm requires a fan angle from each focus point 54 of about 55° in the y-axis direction.

Referring further to FIG. 3, a right-most detector $D_{13}$ detects a plurality of primary beams 60 labeled $P_{113}$, $P_{213}$, . . . $P_{ij}$, . . . $P_{913}$, alternatively referred to herein as an inverse fan beam bundle 70 of primary beams, from each focus point 54 denoted $F_1$, $F_2$, . . . $F_i$, . . . $F_9$ of MFXS 12 that are transmitted by primary collimator 18. Inverse fan beam bundle 70 is significantly narrower than a width of examination area 14 shown in FIG. 3. MFXS 12 as depicted in FIG. 3 is shown for clarity sake and may be smaller than shown. Moreover, only 13 convergence points 62 are shown although, as described above, in practice the number of convergence points 62 can be much greater. Further, the scatter signal is proportional to a number of coherent x-ray scatter detectors 24 incorporated into security detection system 10.

FIG. 3 includes several inverse fan beam bundles 70 of primary beams directed towards a corresponding convergence point $O_j$ and detected by a corresponding coherent x-ray scatter detector $D_j$. During a scan of the object positioned within examination area 14, during which each focus point 54 of MFXS 12 is sequentially activated, the object section is completely irradiated and scatter signals are measured from an entire width of the object. In this embodiment, no mechanical movements are required to achieve a complete 2-D scan of the object. MFXS 12 achieves this with only a small x-ray source dimension along the y-axis. In the exemplary embodiment, MFXS has a length along the y-axis of less than about 500 mm. A small x-ray source dimension is advantageous from the viewpoints of cost and reliability.

In one embodiment, each point in an object section is seen by at least M coherent x-ray scatter detectors. It can be shown that this redundancy condition is fulfilled when the regular spacing, P, between adjacent coherent x-ray scatter detectors satisfies the equation:

$$P = \frac{W_s \cdot V}{M \cdot U}, \qquad \text{Eq. 1}$$

where $W_s$, is a lateral extent of the plurality of focus points, U is a distance from y-axis 58 of MFXS 12 to a top surface 72 of examination area 14, and V is a distance from top surface 72 to a coherent x-ray scatter detector plane at X=L.

In one embodiment suitable for carry-on baggage screening, $W_s$, is approximately 400 mm, U is approximately 1400 mm and V is approximately 700 mm. Hence, a coherent x-ray scatter detector pitch or spacing, P, from Equation 1 is 200 mm for M=1 and 100 mm for M=2. With M=1, all points of the object section are scanned by at least one of the plurality of primary beams emitted by the plurality of focus points onto one coherent x-ray scatter detector $D_j$. With M=2, all points of the object section are scanned by at least two of the plurality of primary beams emitted by the plurality of focus points onto one coherent x-ray scatter detector $D_j$.

A total lateral extent of the detector array, i.e., a distance from coherent x-ray scatter detector $D_1$ to coherent x-ray scatter detector $D_{13}$, is approximately 2200 mm, and corresponds to 23 coherent x-ray scatter detectors 24 having a detector pitch or spacing of 100 mm. The spacing between adjacent coherent x-ray scatter detectors 24 is sufficiently large such that cross-talk scatter from a certain primary beam $P_{ij}$, measured by a coherent x-ray scatter detector $D_{j+1}$ adjacent to coherent x-ray scatter detector $D_j$ to which primary beam $P_{ij}$ is directed, has such a large scatter angle that its coherent scatter contribution can be neglected.

Figure 4:
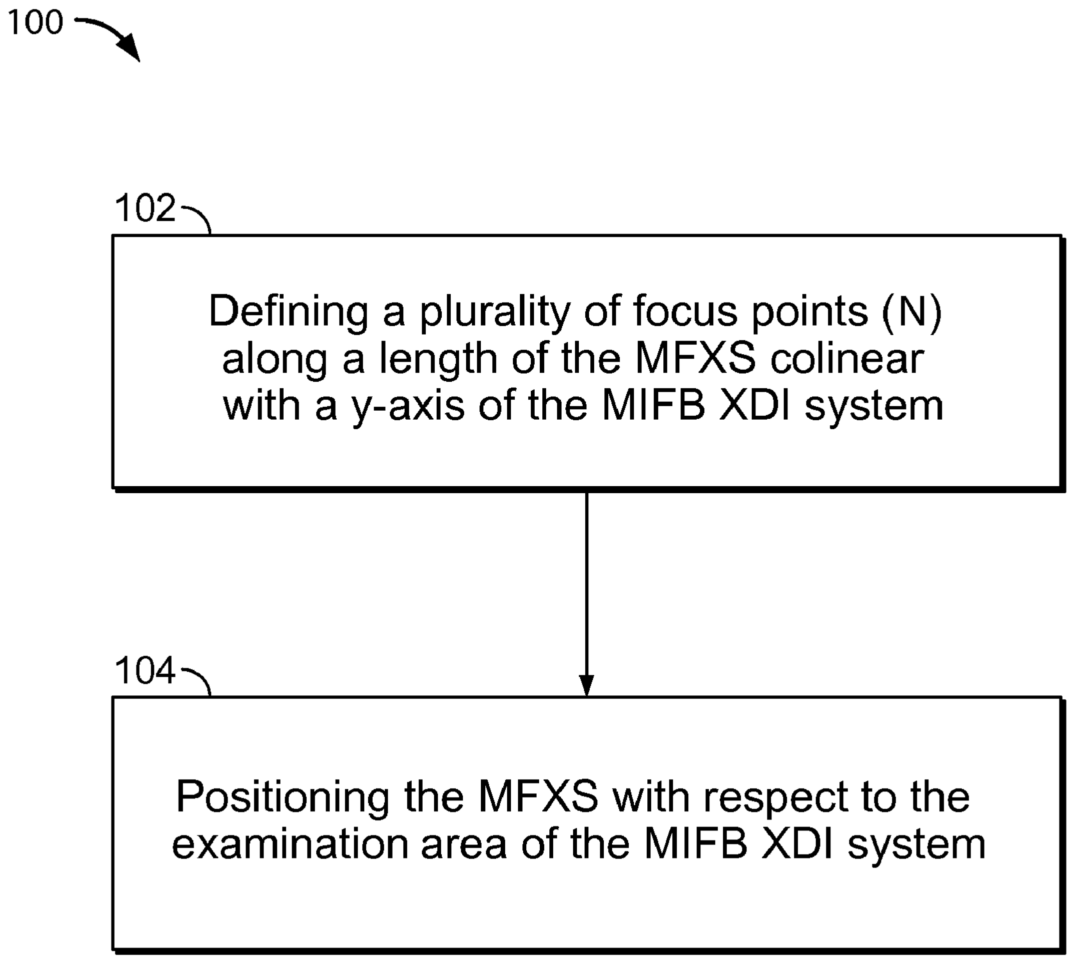
FIG. 4 is a flowchart of an exemplary method for manufacturing or fabricating a multi-focus x-ray source (MFXS) suitable for use with the security detection system shown in FIGS. 2 and 3.

Referring to FIG. 4, in one embodiment, a method 100 for manufacturing or fabricating a multi-focus x-ray source (MFXS) for a multiple inverse fan beam x-ray diffraction imaging (MIFB XDI) system is provided. The MIFB XDI system includes an examination area and a plurality of coherent x-ray scatter detectors positioned with respect to the examination area and configured to detect coherent scatter rays from a plurality of primary beams as the plurality of primary beams propagate through an object positioned within the examination area.

A plurality of focus points (N) are defined 102 along a length of the MFXS colinear with a y-axis of the MIFB XDI system. Each focus point is configured to be sequentially activated to emit an x-ray fan beam including a plurality of primary beams each directed to a corresponding convergence point of a plurality of convergence points positioned along a line parallel to the y-axis at a coordinate X=L.

The MFXS is positioned 104 with respect to the examination area of the MIFB XDI system such that at least M coherent x-ray scatter detectors of the plurality of coherent x-ray scatter detectors are configured to detect scatter rays from the plurality of primary beams as the plurality of primary beams propagate through a section of an object positioned within the examination area to scan the section, when spacing P between adjacent coherent x-ray scatter detectors of the plurality of coherent x-ray scatter detectors positioned with respect to the corresponding convergence point along the line at the coordinate X=L satisfies Equation 1 set forth above, where $W_s$, is a lateral extent of the plurality of focus points, U is a distance from the y-axis to a top surface of the examination area, and V is a distance from the top surface to the line at the coordinate X=L. In one embodiment, $W_s$ is approximately 400 mm, U is approximately 1400 mm and V is approximately 700 mm. For M=1, spacing P is 200 mm and, for M=2, spacing P is 100 mm. Further, the MFXS is formed having a length along the y-axis less than 500 mm.

The above-described MIFB XDI system includes an MFXS that is very compact, i.e., not greater than 500 mm in length, to facilitate achieving a uniform signal distribution across the object being scanned. Additionally, the MFXS as described herein is less expensive than conventional x-ray sources to fabricate and has a longer lifetime the x-ray sources incorporated into conventional MIFB XDI systems and configurations. As a result, the MIFB XDI system including the MFXS as described herein facilitates reducing a fabrication cost for the system, increasing a lifetime of the x-ray source, providing a uniform intensity distribution, lowering a false alarm rate and/or increasing a detection rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-focus x-ray source (MFXS) for a multiple inverse fan beam x-ray diffraction imaging (MIFB XDI) system including an examination area and a plurality of coherent x-ray scatter detectors positioned with respect to the examination area and configured to detect coherent scatter rays from a plurality of primary beams as the plurality of primary beams propagate through an object positioned within the examination area, the plurality of coherent x-ray scatter detectors positioned with respect to a plurality of convergence points positioned along a line parallel to a y-axis of the MIFB XDI system at a coordinate X=L, the MFXS comprising:

a plurality of focus points (N) defined along a length of the MFXS colinear with the y-axis, each focus point of the plurality of focus points configured to be sequentially activated to emit an x-ray fan beam including the plurality of primary beams each directed to a corresponding convergence point of the plurality of convergence points, the MFXS configured to generate the plurality of primary beams, and at least M coherent x-ray scatter detectors of the plurality of coherent x-ray scatter detectors configured to detect coherent scatter rays from the plurality of primary beams as the plurality of primary beams propagate through a section of the object positioned within the examination area when a spacing P between adjacent coherent x-ray scatter detectors of the plurality of coherent x-ray scatter detectors satisfies the equation:

$$P = \frac{W_s \cdot V}{M \cdot U},$$

where $W_s$, is a lateral extent of the plurality of focus points, U is a distance from the y-axis to a top surface of the examination area, and V is a distance from the top surface to the line at the coordinate X=L.

2. An MFXS in accordance with claim 1, wherein, with M=1, all points of the section are scanned by at least one of the plurality of primary beams emitted by the plurality of focus points onto one coherent x-ray scatter detector $D_j$.

3. An MFXS in accordance with claim 1, wherein $W_s$, is approximately 400 mm, U is approximately 1400 mm and V is approximately 700 mm.

4. An MFXS in accordance with claim 1, wherein for M=1 the spacing P is 200 mm.

5. An MFXS in accordance with claim 1, wherein for M=2 the spacing P is 100 mm.

6. An MFXS in accordance with claim 1, wherein the MFXS has a length along the y-axis less than 500 mm.

7. A multiple inverse fan beam x-ray diffraction imaging (MIFB XDI) system, comprising:

a multi-focus x-ray source (MFXS) comprising an anode and a plurality of focus points (N) arranged along a length of the anode colinear with a y-axis of the MFXS, each focus point of the plurality of focus points configured to be sequentially activated to emit an x-ray fan beam including a plurality of primary beams;

an examination area; and a plurality of coherent x-ray scatter detectors positioned with respect to the examination area and configured to detect coherent scatter rays from the plurality of primary beams as the plurality of primary beams propagate through an object positioned within the examination area, each coherent x-ray scatter detector of the plurality of coherent x-ray scatter detectors positioned with respect to a corresponding convergence point of a plurality of convergence points positioned along a line parallel to the y-axis at a coordinate X=L, at least M coherent x-ray scatter detectors of the plurality of coherent x-ray scatter detectors configured to detect the coherent scatter rays as the plurality of primary beams propagate through a section of the object and a spacing P between adjacent coherent x-ray scatter detectors of the plurality of coherent x-ray scatter detectors satisfies the equation:

$$P = \frac{W_s \cdot V}{M \cdot U},$$

where $W_s$, is a lateral extent of the plurality of focus points, U is a distance from the y-axis to a top surface of the examination area, and V is a distance from the top surface to the line at coordinate X=L.

8. An MIFB XDI system in accordance with claim 7, wherein, with M=1, all points of the section are scanned by at least one of the plurality of primary beams emitted from the plurality of focus points onto one coherent x-ray scatter detector $D_j$.

9. An MIFB XDI system in accordance with claim 7, wherein $W_s$, is approximately 400 mm, U is approximately 1400 mm and V is approximately 700 mm.

10. An MIFB XDI system in accordance with claim 7, wherein for M=1 the spacing P is 200 mm.

11. An MIFB XDI system in accordance with claim 7, wherein for M=2 the spacing P is 100 mm.

12. An MIFB XDI system in accordance with claim 7, wherein the MFXS has a length along the y-axis less than 500 mm.

13. A method for fabricating a multi-focus x-ray source (MFXS) for a multiple inverse fan beam x-ray diffraction imaging (MIFB XDI) system including an examination area and a plurality of coherent x-ray scatter detectors positioned with respect to the examination area and configured to detect coherent scatter rays from a plurality of primary beams as the plurality of primary beams propagate through an object positioned within the examination area, the method comprising:

defining a plurality of focus points (N) along a length of the MFXS colinear with a y-axis of the MIFB XDI system, each focus point of the plurality of focus points configured to be sequentially activated to emit an x-ray fan beam including a plurality of primary beams each directed to a corresponding convergence point of a plurality of convergence points positioned along a line parallel to the y-axis at a coordinate X=L; and positioning the MFXS with respect to the examination area of the MIFB XDI system, at least M coherent x-ray scatter detectors of the plurality of coherent x-ray scatter detectors configured to detect the coherent scatter rays as the plurality of primary beams propagate through a section of an object positioned within the examination area and a spacing P between adjacent coherent x-ray scatter detectors of the plurality of coherent x-ray scatter detectors positioned with respect to the corresponding convergence point along the line at the coordinate X=L, satisfies the equation:

$$P = \frac{W_s \cdot V}{M \cdot U},$$

where $W_s$, is a lateral extent of the plurality of focus points, U is a distance from the y-axis to a top surface of the examination area, and V is a distance from the top surface to the line at the coordinate X=L.

14. A method in accordance with claim 13, wherein $W_s$, is approximately 400 mm, U is approximately 1400 mm and V is approximately 700 mm.

15. A method in accordance with claim 13, wherein for M=1 the spacing P is 200 mm.

16. A method in accordance with claim 13, wherein for M=2 the spacing P is 100 mm.

17. A method in accordance with claim 13, wherein the MFXS is formed having a length along the y-axis less than 500 mm.

* * * * *